Patented Mar. 27, 1923.

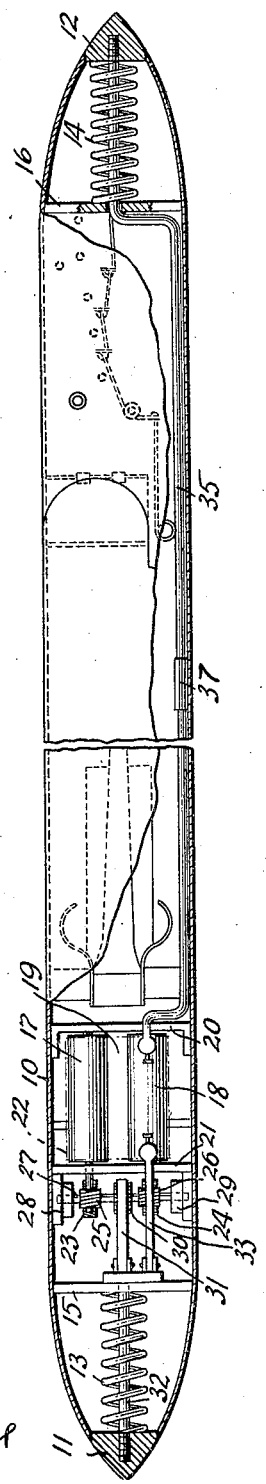
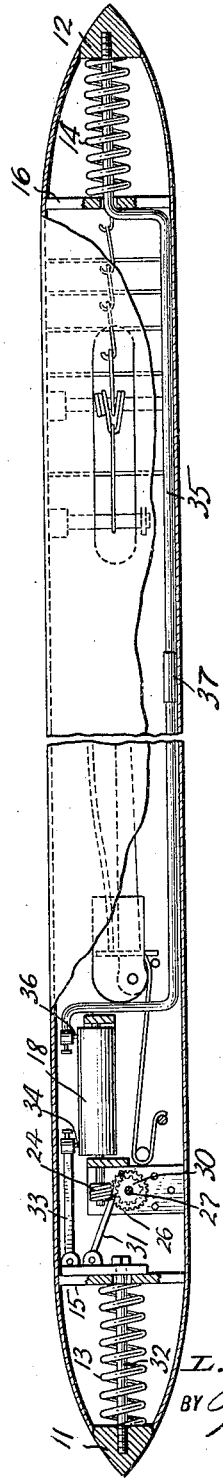

1,450,097

UNITED STATES PATENT OFFICE.

LEONARD JOSEPH McCORMACK, OF DUMONT, NEW JERSEY.

SHUTTLE-PRESSURE INDICATOR.

Application filed March 16, 1922. Serial No. 544,314.

*To all whom it may concern:*

Be it known that I, LEONARD J. McCORMACK, a citizen of the United States, and a resident of Dumont, in the county of Bergen and State of New Jersey, have invented a new and Improved Shuttle-Pressure Indicator, of which the following is a full, clear, and exact description.

The invention relates to shuttle pressure indicators.

The general object of the invention is the provision of a shuttle pressure indicator that may be mounted in a shuttle to record the strength of the strokes delivered by the picker sticks to provide a means for guiding the operator in equalizing the strokes and in adjusting the machine so as to give the required stroke thus greatly reducing the wear and tear on the machine.

A further object of the invention is the provision of a recording means in conjunction with a shuttle so as to provide a means for the proper timing of the shuttle at various points in shed thereby reducing unnecessary friction on the threads which are under the process of being woven.

This object is accomplished by mounting a slidable nose piece in each end of the shuttle body which may be operated against spring means of known strength and providing in association with the nose pieces means for recording the distance through which they are moved by the strokes of the operating picker sticks.

This and other objects of the invention will be more clearly understood from the following detailed description and accompanying drawings.

Figure 1 is a top plan view of the shuttle with the top broken away to disclose the recording mechanism;

Figure 2 is a side elevation with a part of the shuttle body broken away to disclose a side elevation of the shuttle pressure indicator.

Referring to the above-mentioned drawings, a shuttle body 10 is shown in which the shuttle pressure indicator assemblage is located. This shuttle pressure indicator assemblage consists of two slidable nose pieces 11 and 12, one slidably mounted in each end of the shuttle body 10. These nose pieces 11 and 12 extend beyond the ends of the shuttle body so as to receive the operating strokes from the picker sticks. Co-operating with the nose pieces 11 and 12, respectively, are springs 13 and 14 which are associated respectively with the fixed walls 15 and 16 attached to the shuttle body 10. The strength of the springs 13 and 14 is known and consequently if means are provided for indicating the distance through which they are compressed by the strokes of the picker sticks it is a simple matter to determine the strength of the strokes.

The recording means consists of two rollers 17 and 18 journaled in plates 20 and 21 fixed in the shuttle body 10. The rollers 17 and 18 are provided with spiral gears 23 and 24, respectively. These spiral gears mesh respectively with the spiral gears 25 and 26 which are mounted on a ratchet wheel shaft 27 journaled in bearings 28 and 29 attached to the shuttle body 10. A ratchet wheel 30 is located on the ratchet shaft 27 and is operated by a rack 31. This rack 31 is connected to a pin 32, which is slidably mounted in the wall 15, extended through the spiral spring 13 and attached to the nose piece 11. A recording sheet 22 is mounted on the rollers 17 and 18. A pencil arm 33 in which is mounted a pencil 34 is attached to the pin 32. Thus the pencil 34 will move with the nose piece 11 and indicate on the recording sheet 22 the distance through which the nose piece 11 moves. A pencil arm 35 is directly connected with the nose piece 12 and has a pencil 36 mounted therein. This pencil arm 35 has a buckle 37 associated therewith for adjusting its length.

The operation of this device is as follows:

When the nose piece 11 receives a stroke from the picker stick it is forced inward, compressing the spring 13. It also forces the pin 32 inward causing the rack 31 to operate the ratchet wheel 30. The ratchet wheel through the ratchet wheel shaft rotates the spiral gears 25 and 26. These spiral gears 25 and 26 mesh with the spiral gears 23 and 24, respectively, which are fixed to the rollers 17 and 18, therefore, upon the rotation of the gears 25 and 26, the rollers 17 and 18 are operated and serve to move the recording sheet 22. The pencil 34 which is rigidly connected to the nose piece 11 through the pencil arm 33 and pin 32 marks on the recording sheet 22 the distance through which the nose piece moved. The spring 13 is of known strength and upon ascertaining the distance through which it has been compressed the force of the stroke may be determined.

If the stroke of the right-hand picker stick is delivered to the nose piece 12 it is forced inward against the resistance of the spring 14 compressing the latter. The pencil 36 which rests upon the recording sheet 22 being directly connected to the nose piece 12 registers the distance through which the nose piece has been moved. This is also the distance through which the spring 14 has been compressed and therefore the force of the stroke may be determined.

I would state in conclusion that while the illustrated example constitutes a practical embodiment of my invention I do not limit myself strictly to the exact details herein illustrated since manifestly the same can be considerably varied without departing from the spirit of the invention as defined in the appended claims.

Claims:

1. In combination with a shuttle, a shuttle pressure indicator, comprising a slidable nose piece, means mounted in the shuttle and associated with the slidable nose piece for recording the movement of the latter, and spring means for normally retaining the nose piece in position.

2. In combination with a shuttle, a shuttle pressure indicator of the class described, comprising two nose pieces slidably mounted in the ends of the shuttle, spring means provided in conjunction with each nose piece normally holding the nose pieces in position in the ends of the shuttle, recording means mounted in the shuttle, and means interposed between the nose pieces and said recording means to operate the latter to record the movement of either nose piece.

3. In combination with a shuttle, a shuttle pressure indicator of the class described, comprising a slidable nose piece mounted in each end of the shuttle, spring means co-operating with the nose pieces to normally hold them in position in the ends of the shuttle, recording means for recording the movements of the nose pieces located in the shuttle, and means for operating the recording means interposed between the nose pieces and said recording means.

4. In combination with a shuttle, a shuttle pressure indicator of the class described, comprising a slidable nose piece mounted in each end of the shuttle, spring means in conjunction with the nose pieces for normally holding them in position in the ends of the shuttle, a recording sheet and means for operating it associated with the nose piece, and means for indicating upon the recording sheet the movement of the nose pieces secured in fixed relation to the latter.

5. In combination with a shuttle, a shuttle pressure indicator of the class described, comprising an indicating means mounted in the shuttle, slidable means mounted in each end of the shuttle and extending beyond the same co-operating with the recording means to operate the same to indicate the movement of the said slidable means, and compressible means of known strength serving to normally hold the slidable means in position in the ends of the shuttle.

6. In combination with a shuttle, a shuttle pressure indicator of the class described, comprising a nose piece slidably mounted in each end of the shuttle, spring means co-operating with the nose pieces to normally retain them in position in the ends of the shuttle, recording means for recording the movement of the nose pieces located in the shuttle, and means interposed between one nose piece and the recording means to operate the latter upon the movement of said nose piece.

7. In combination with a shuttle including a shuttle body, a shuttle pressure indicator of the class described comprising a nose piece slidably mounted in each end of the body and extending beyond the same for receiving the stroke of the picker stick, spring means co-operating with the nose pieces to normally retain them in position in the ends of the body, a recording sheet and means for operating the same located in the shuttle body, and means interposed between the recording sheet operating means and one nose piece for operating the recording sheet upon each movement of the said nose piece and means associated with the nose pieces for marking on the recording sheet the distance through which they have been moved by each stroke of the picker stick.

8. In combination with a shuttle including a shuttle body and operated by picker sticks, a shuttle pressure indicator of the class described, comprising means slidably mounted in each end of the shuttle body to receive the strokes of the picker sticks, spring means for normally holding said stroke receiving means in position in the ends of the shuttle body to receive the strokes, and recording means mounted in the shuttle body and associated with the stroke receiving means to record the distance through which they have been moved.

9. In combination with a shuttle including a shuttle body and means for operating the same, a nose piece slidably mounted in each end of the shuttle body to receive the operating strokes from the operating means, spring means co-operating with each nose piece to normally hold it in a stroke receiving position in the end of the shuttle body, and recording means associated with the nose pieces and operated by operating means connected to one of them for recording the distance through which the nose pieces are moved against the spring means by the operating strokes.

10. In combination with a shuttle including a shuttle body and means for operating the same, a nose piece slidably mounted in each end of the shuttle body to receive the strokes of the operating means, spring means fixed to the shuttle body and co-operating with the nose pieces to normally hold them in their stroke receiving positions, a recording sheet and means for operating the same mounted in the shuttle body, means interposed between one nose piece and the recording sheet operating means to operate the latter upon the movement of the said nose piece, and means fixed to each nose piece for marking on the recording sheet the movements of the nose pieces.

11. A pressure indicator for shuttles comprising nose pieces slidably mounted in the shuttle, and means operated by the nose pieces for recording their movement.

12. A shuttle pressure indicator for use with shuttles having slidable nose pieces comprising means for normally retaining the nose pieces in position, and means operated upon the operation of the nose pieces to indicate the movement of the latter.

13. A pressure indicator for shuttles comprising nose pieces slidably mounted in the shuttle, means for normally holding the nose pieces in their forward position in the ends of the shuttle, and means operated upon the movement of the nose pieces for recording the movement of said nose pieces.

14. A pressure indicator for shuttles, comprising nose pieces slidably mounted in the ends of the shuttle, spring means for normally retaining the nose pieces in their forward positions in the ends of the shuttle, and means operated by the nose pieces when they are moved for recording the movement of the nose pieces.

LEONARD JOSEPH McCORMACK.